United States Patent [19]

Hall, Jr. et al.

[11] 4,231,439
[45] Nov. 4, 1980

[54] AUTOMATIC CHECK WEIGHER

[75] Inventors: James F. Hall, Jr., Ardsley, Pa.; Ralph J. Lake, Jr., Maple Shade; William G. Scholder, Budd Lake, both of N.J.

[73] Assignee: Franklin Electric Subsidiaries, Inc., Levittown, Pa.

[21] Appl. No.: 32,213

[22] Filed: Apr. 23, 1979

[51] Int. Cl.³ .................. G01G 19/04; G01G 19/52; G01G 23/10
[52] U.S. Cl. .......................... 177/25; 177/1; 177/50; 177/185
[58] Field of Search ............ 177/1, 25, 50, 145, 177/185, DIG. 8; 364/567, 568

[56] References Cited

U.S. PATENT DOCUMENTS

| 3,276,525 | 10/1966 | Cass | 177/DIG. 8 |
| 3,446,298 | 5/1969 | Cory et al. | 177/DIG. 8 |
| 3,446,299 | 5/1969 | Leonowicz | 177/DIG. 8 |
| 3,770,069 | 11/1973 | Loshbough | 177/25 X |
| 4,102,421 | 7/1978 | Ozaki et al. | 177/185 |
| 4,137,568 | 1/1979 | Dlugos | 177/25 X |

FOREIGN PATENT DOCUMENTS 2320391  11/1974  Fed. Rep. of Germany ........... 177/185

Primary Examiner—George H. Miller, Jr.
Attorney, Agent, or Firm—Paul & Paul

[57] ABSTRACT

A high speed weighing machine, for determining the weight of a package "on-the-fly", with respect to a predetermined weight range, as the package travels across a weigh cell weighing platter, incorporates apparatus for interpreting multiple samplings of the weight bearing on the weighing platter for determining the interval during which the package is fully on this weighing platter and for calculating the average weight registered by the weighing platter during that interval wherein three periods are defined for each weighing operation.

15 Claims, 11 Drawing Figures

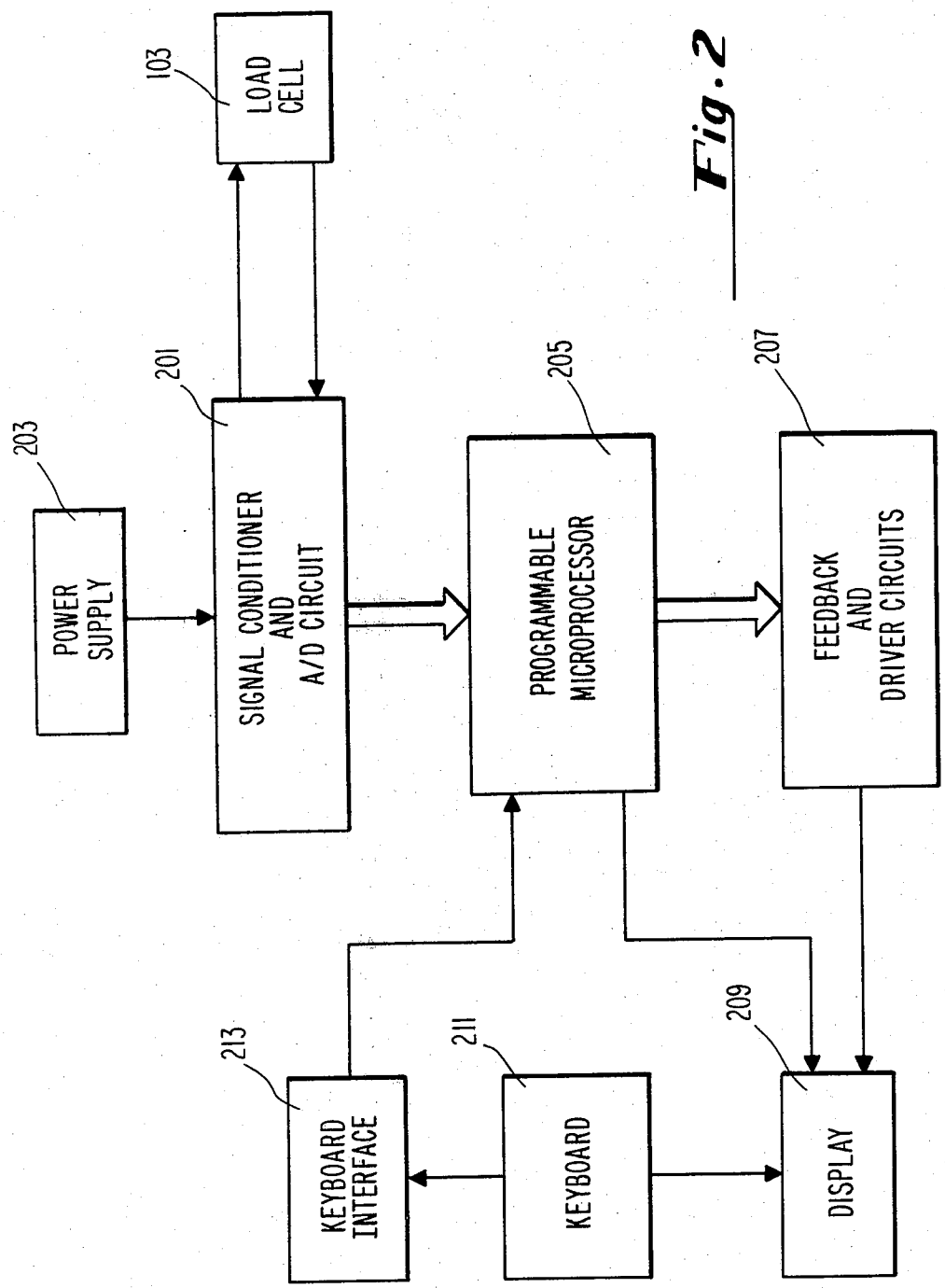

AUTOMATIC CHECK WEIGHER

BACKGROUND OF THE INVENTION

This invention is related to automatic weighing machines of the check weigher type as used in the packaging industry and more specifically those types of check weighers which incorporate the use of an automatic package transport system for moving packages across a weighing platter in a steady stream whereupon the weight of each package relative to an acceptable weight range is determined. A load cell or weigh cell is connected to the weighing platter for electromechanically determining weight.

Weighing machines have been incorporated into the production facilities in the packaging industry for many years. These machines are used to weigh a final product package to determine if that package contains the net weight specified on the label. Such weighers are used in the pharmaceutical industries, the canning and bottling industries and any other types of industry where goods are packaged and sold by weight. Prior, early vintage check weigher machines were simple scales which were loaded and unloaded by an operator. An acceptable weight, plus or minus a predetermined tolerance, was normally marked on the scale so that the operator could readily check a given package to determine if its weight was within the specified range.

Improvements in check weighing apparatus incorporated continuous feed and discharge features, including automatic feed and discharge procedures for the weighing of the packages. Weights were determined while a package was momentarily on a weighing platter. In such systems an input feed belt deposited a package on a weighing platter. The momentum carried the package across the platter and onto the discharge belt.

Very often weighing platters have included rollers which allow a package to slide across the weighing platter without drastically jarring it. Chains, belts, chutes and other means have been employed for feeding and discharging the weighing platter.

With the advent of such dynamic "on-the-fly" type check weighing apparatus, a dominant problem of accurately determining the weight of the package as a package travels rapidly across the weighing platter developed. This problem included more than just the rapid reading of a weight. The weighing platter normally, with this type of operation, is subjected to an impulse as the package first hits it. This impulse causes an oscillation in the weighing platter and the weigh cell structure. Such an oscillation takes a fixed period of time to dampen out. Before this happens a package may have moved off of the platter.

With prior art check weighers it was determined that an acceptable level of oscillation of "error" would be permitted in order to obtain a high throughput rate thus reducing the transient time that a package is on the weighing platter. Normally, therefore, the package would be weighed, i.e., the weigh cell reading would be sampled, when the package has reached about three quarters to seven-eighths of the distance across the weighing platter but while still remaining completely on the weighing platter.

Given this design criteria, prior art check weighers would trigger a sample reading of the weigh cell upon a position or location of a package on the weighing platter. Mechanical gate "fingers", photoelectric cells and the like have been taught as triggering devices for sampling the weigh cell output as a package reached a certain spot across the weighing platter.

Recently, electronic techniques have been applied to the check weighing art. Electronic scales and weighing systems have been developed which provide a relatively rapid read out in digital format. A particularly useful system includes the connection of a digital conversion circuit to the weigh cell which converts the analogue voltage output from the weigh cell into a digital output signal corresponding to the weight of the package. Such a system is taught by Kavanagh, et al, U.S. Pat. No. 4,049,068.

Kavanagh teaches the classic positionally-triggered read out scheme wherein retroreflective photosensors are used in conjunction with reflectors to control the timing of the weight sampling and registering system upon the movement of incoming articles for triggering a sample reading from the weigh cell, i.e., the weight reading.

Kavanagh also teaches a method of establishing a weight of a package by subtracting the weighing platter laden weight from the weighing platter unladen weight for each and every package passing through a check weigher. This method eliminates the need for providing a stable "zero" reference when the weighing platter is unladen. However, it limits the throughput rate and therefore the capacity of the machine by requiring a sampling of unladen weighing platter weight between each package.

Traditionally electronic check weighing circuits have been "zeroed", statically, by using the circuit output for a stable, quite, unladen weighing platter as reference. This is necessary because measuring systems using sophisticated electronic equipment including digital circuitry must concern themselves with the normal electronic drift in the equipment which processes the weigh cell signal. This circuitry drift which introduces error and causes inaccuracies in output readings is a normal occurrance with operating hours, changes in ambient temperature and humidity, repeated subjection to start-up and turn-off transients and many other factors. However, the static zeroing technique of an unladen platter may prove unsatisfactory for dynamic weighing conditions.

While check weighers have become considerably more sophisticated than ever before, room for improvement still abounds.

A better technique for dealing with weighing platter transients is needed to obtain more accurate output readings. Automatic dynamic zeroing is also desirable. Moreoever, it is desirable to eliminate position, triggered sampling of the weigh cell output for such position triggered sampling techniques can very often introduce errors as throughput times (i.e., package traveling speeds) vary. Such triggering devices very often are able to accomodate only certain ranges of package traveling speeds.

An object of this invention is to provide an automatic check weigher which samples weigh cell output independent of package position with regard to a specific, single point on a weighing platter.

A second object of this invention is to provide such an automatic check weigher which samples load cell output during impulse and oscillation periods as a package travels across the weighing platter.

A further object of this invention is to provide this check weigher with the capability of analyzing multiple samplings to determine three periods for each weighing operation: an initial impulse package load period, a package-on-the-weighing platter period, and a package discharging and weight display period.

An even further object of this invention is to provide this check weigher with the ability to calculate an average weight from multiple samples taken during the package-on-the-weighing platter period.

Additionally, a further object of this invention is to provide this check weigher with an automatic calibrating capability including dynamic sensing as well as to provide it optional multiple calibration run capability and keyboard data entry capability.

SUMMARY OF THE INVENTION

The objects of this invention may be realized in an automatic programmable-microprocessor controlled, check weight machine. A weighing platter is connected to a weigh cell which structure may be conventional in nature. An input conveyor may be used to feed a series of packages onto the weighing platter. A transfer mechanism may be included to transfer each package in turn across the weighing platter and then to discharge the package onto a discharge conveyor.

The output of the weigh cell may be sampled by digital electronic circuitry incorporating a programmable-microprocessor. This circuitry is operable to control the mechanical operation of the input and discharge conveyors and the weighing platter transfer mechanism. Moreoever, this circuitry also may sample the weigh cell output, may calculate package weight and may display check weight information. Keyboard data entry may be included, as well as information storage and print out.

Preferably, the circuitry divides the time that a package traverses the weighing platter, into three components: an increment period, a sample period and a calculate and display period. In the increment period, the output of the weigh cell increases rapidly as a package enters onto the weighing platter as an initial package loading impulse. The sample period then begins wherein the package, weighing platter and weigh cell structure oscillate and the package is wholly on the weighing platter. During this sample period successive sampled weigh cell outputs vary within a predetermined tolerance range. These sample values are stored. The calculate and display period is initialed when the weigh cell output sample value decreases below the predetermined tolerance range indicating that the package begins to move off the platter. Stored sample values are then averaged and displayed as actual weight or deviation from target weight.

An automatic dynamic calibrating technique may be incorporated wherein a "standard" calibration package may be serially run through the machine and the digital scaling in the weight calculating portion of the circuitry may be set to calibrate the machine for dynamic weighing conditions. This is accomplished by making the circuit signal value representative of the "measured" calibration weight equal to a keyboard entered calibration weight value. Under the control of the microprocessor circuit, a keyboard entered number of calibration "runs" may be performed and the dynamic "measured" calibration weight equated to the keyboard entered weight, which in fact is the actual weight of the "standard" calibration package run through the machine.

DESCRIPTION OF THE DRAWINGS

The advantages, features and operation of the invention will be understood from a reading of the following detailed descriptions of the invention in conjunction with the attached drawings in which like numerals refer to like elements and in which:

FIG. 2 is a diagram showing the general electrical features of this check weighing machine.

THE DETAILED DESCRIPTION OF THE INVENTION

Figure 1:
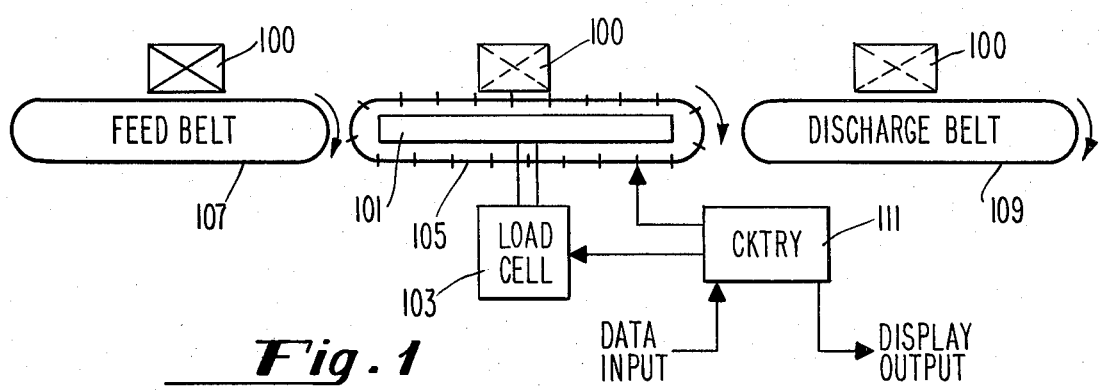
FIG. 1 is a diagram showing the general mechanical features of the automatic check weighing machine.

An automatic machine for checking the weight of a package 100 against a predetermined target weight includes a weighing platter structure 101 which is connected to a transducer load cell device 103. This load cell 103 can be of the strain gauge type. The weight platter 101 may have a transfer mechanism 105 connected therewith. This transfer mechanism 105 can be a continuous belt, chain or rollers which facilitates the sliding or transferring of the package 100 across the weighing platter structure 101.

A feed belt 107 is employed to feed the package 100 on to the transfer belt 105 of the weighing platter 101 structure. A discharge belt 109 is employed to carry the package 100 away from the transfer belt 105 as the package moves off of the weighing platter 101 structure.

Electrical circuitry 111 is employed to control the operation of the transfer belt 105 and the feed belt 107 and discharge belt 109. This circuitry 111 monitors the operation of the transfer belt 105 and supplies electrical power to the operation of the load cell 103. Output signals from the load cell 103 are monitored by this circuitry 111 and operated in conjunction with the operation of the transfer belt 105 and the transferring of a package 100 across the weighing platter 101. Data input to the circuitry is also used. An output is displayed by this circuitry which tells an operator that a package passing over the weighing platter is within a given tolerance of the target weight or the package is under or over weight.

The circuitry 111 is shown in FIG. 2. Here load cell 103 is connected for receiving and sending electrical power/signals to a signal conditioner and analogue to digital circuit component 201. This signal conditioner and circuit component 201 is connected to a power supplied circuit 203 on one hand and to a programmable microprocessor 205 on the other hand.

The programmable microprocessor 205 is connected to feedback and driver circuits 207. This microprocessor is also connected to send signals to a display 209. Feedback and driver circuits 207 are also connected to send signals to the display 209.

A keyboard 211 is connected to send signals to a keyboard interface circuit 213 which in turn is connected to the programmable microprocessor 205.

Figure 3:
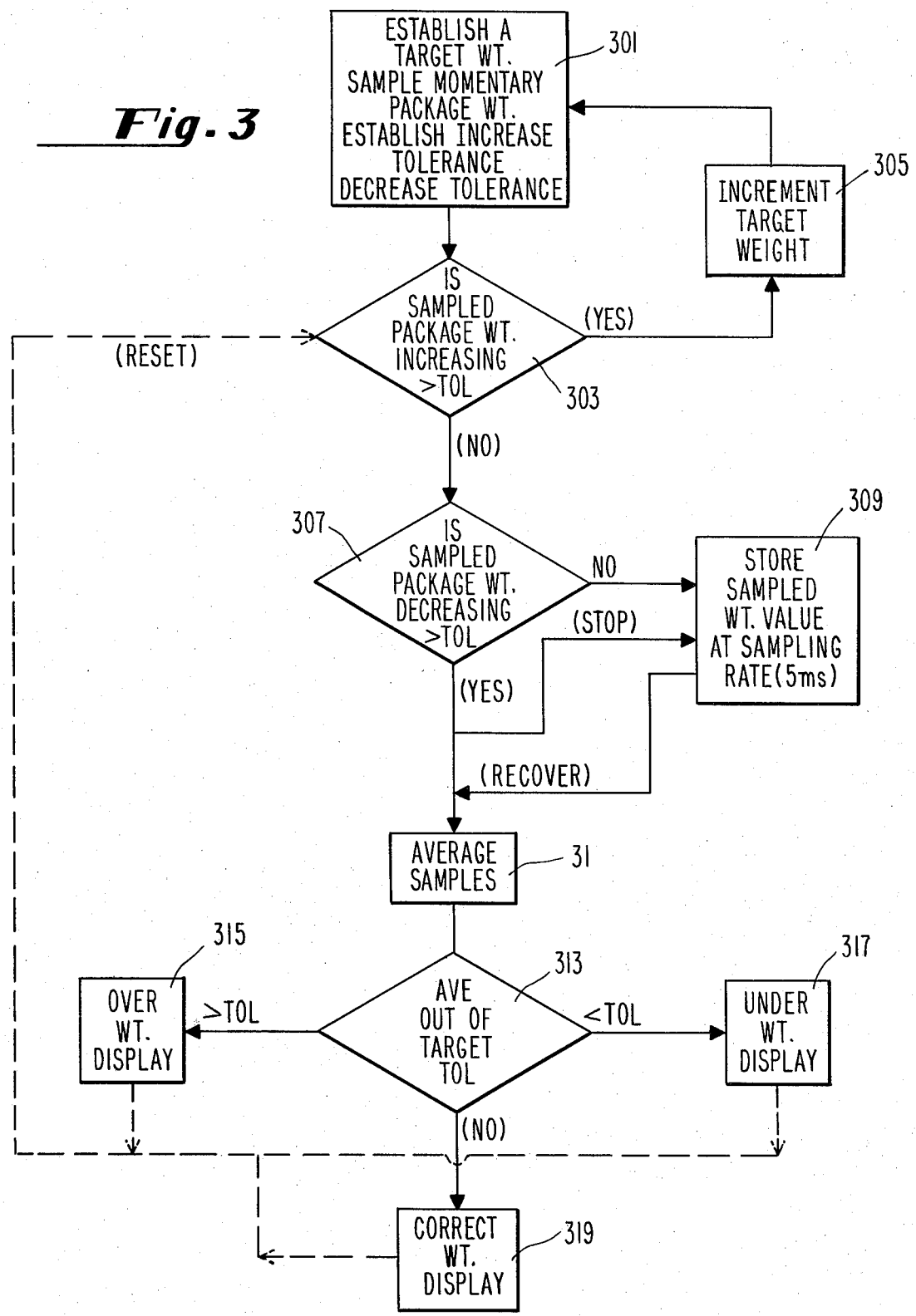
FIG. 3 shows a general operational flow diagram of the weighing operation performed by the circuitry of FIG. 2.
Figure 6A:
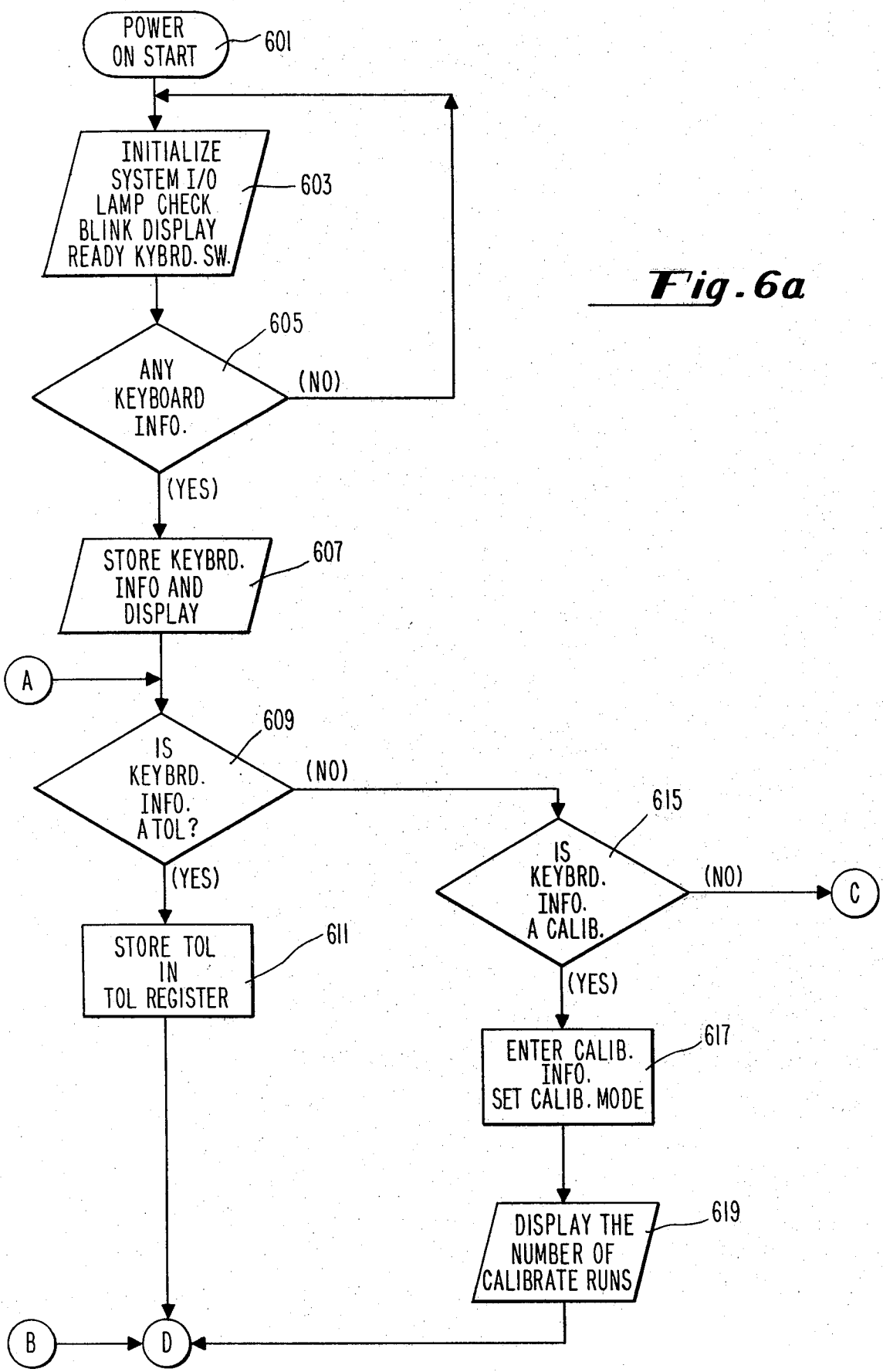
FIGS. 6 a–e shows a flow diagram for a specific detailed operational implementation carried out by the circuitry of FIG. 2.
Figure 6B:
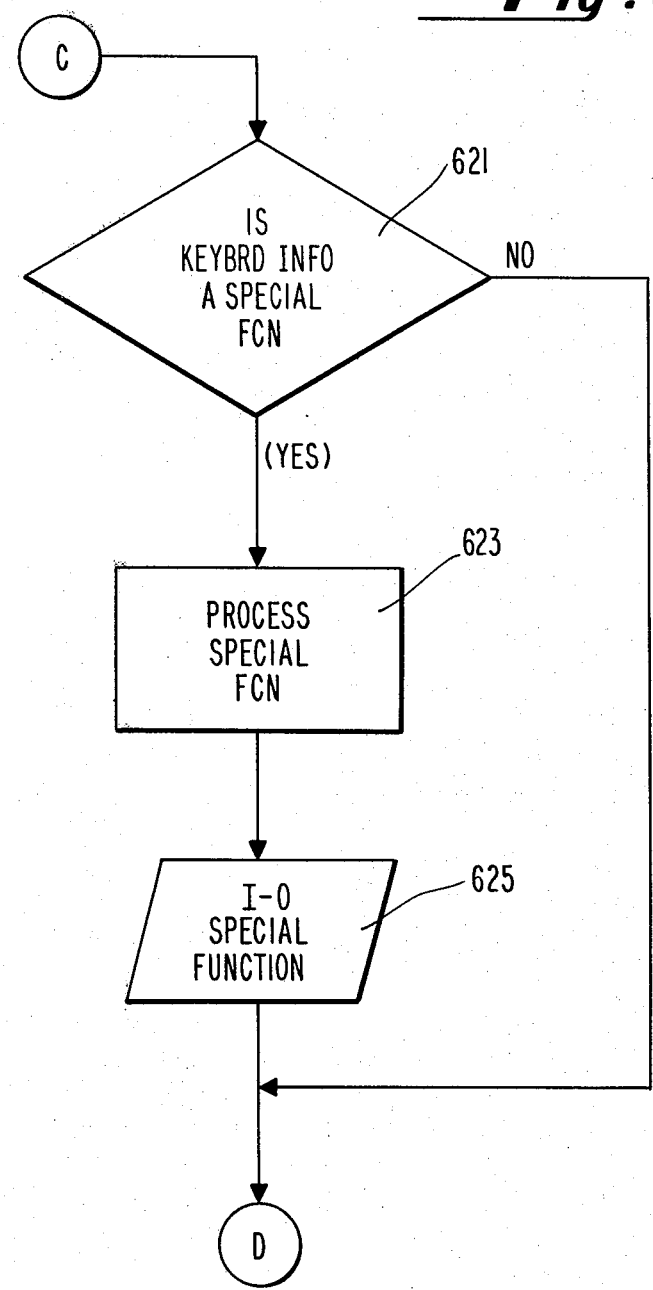
Figure 6C:
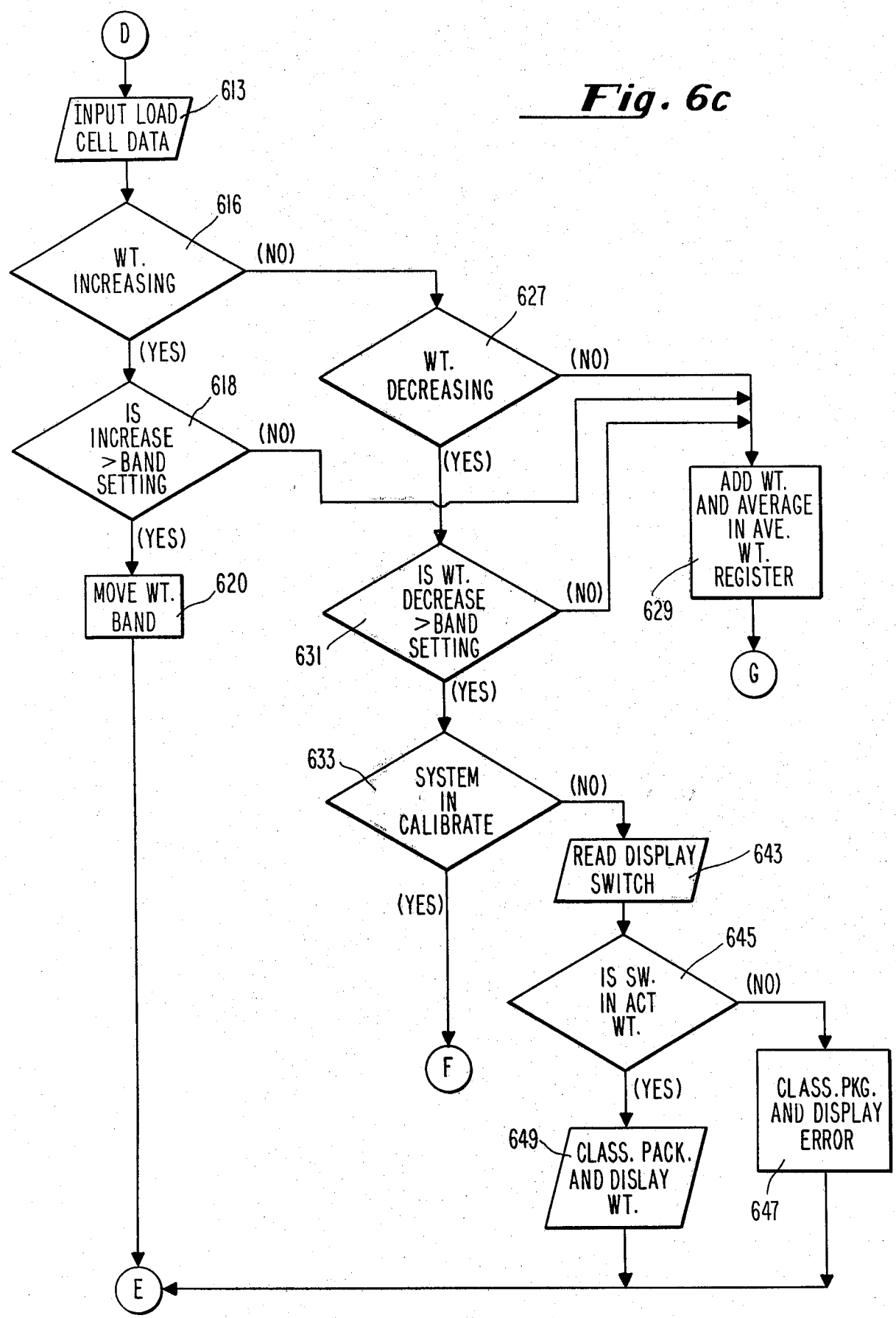
Figure 6D:
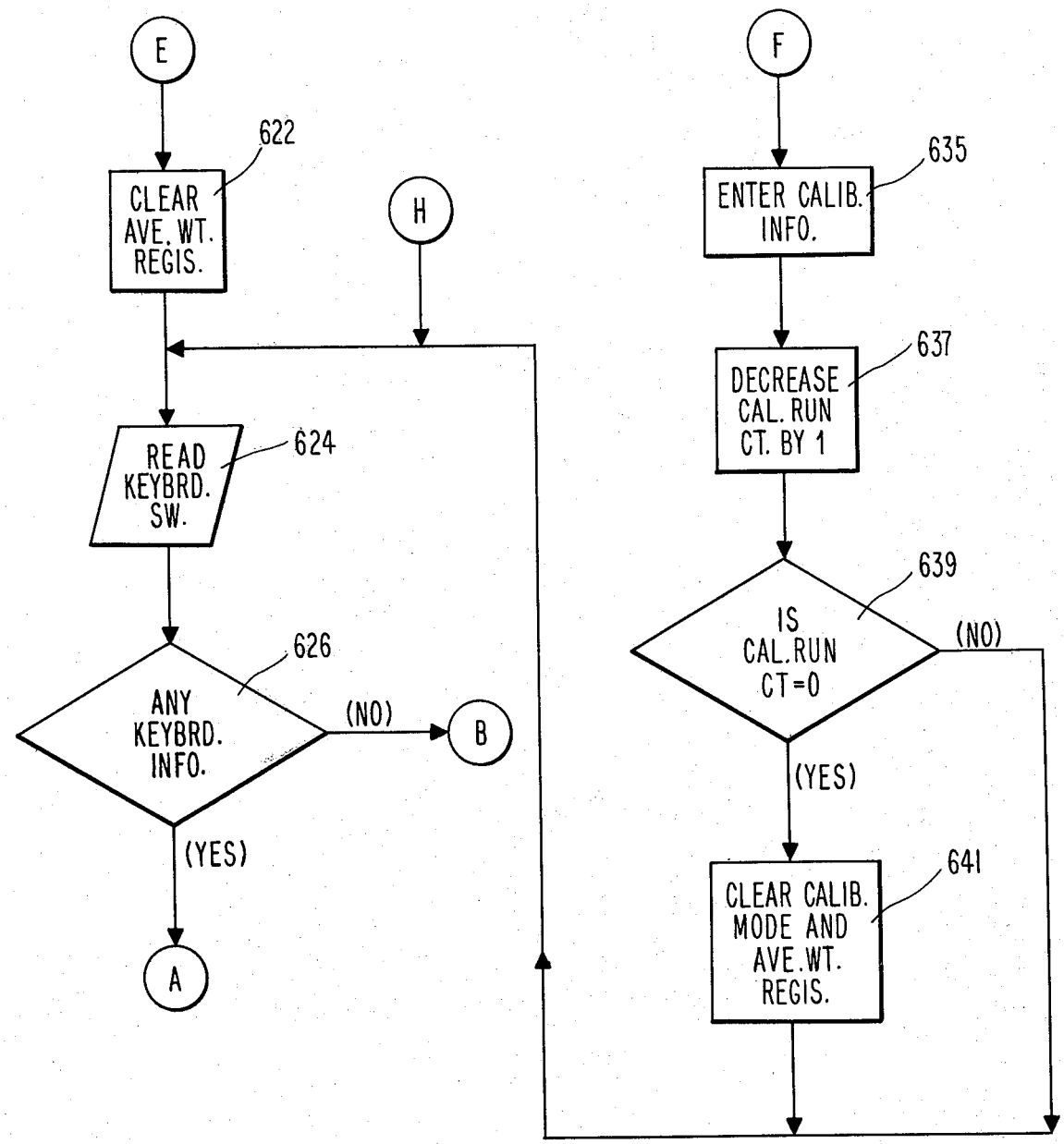
Figure 6E:
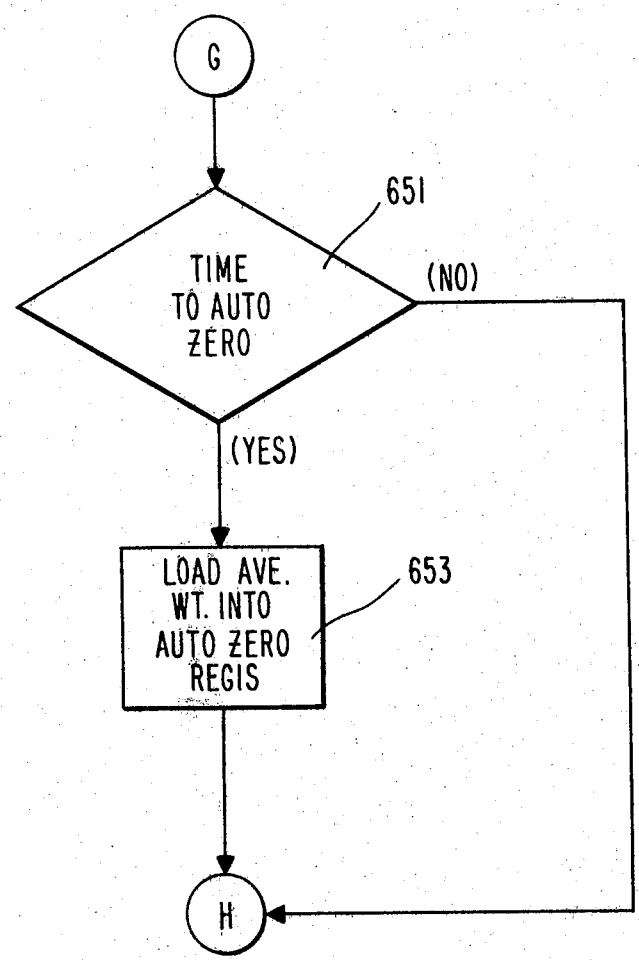

FIG. 3 shows a general operational flow diagram of the weighing operation performed by the circuitry of FIG. 2. Here a target weight is established 301 for the momentary package weight readings obtained from the load cell 103. The load cell 103 output is sampled at a five millisecond rate, the sampling circuitry being driven by a two hundred Hz clock. A tolerance band is also established for an acceptable variance of the momentary package weight.

If successive samples of the momentary package weight show that the weight is increasing and therefore exceeding the plus tolerance an initial target weight is incremented 305. If however, the successive samples values of package weight no longer show the weight to be increasing these successive values are then determined to see if the weight is decreasing 307. If the weight does not decrease in excess of a given negative tolerance, momentary package weight values are stored at the sampling rate of one every five milliseconds 309. When step 307 shows the weight to decrease excessively the stored sample values 309 are recovered and these values are mathematically averaged 311 to provide an average weight for the package 100 as it was sampled. This average weight represents the weight of the package 100 as it was totally on the weighing platter 101. This weight value is then interrogated 313 to determine if the mathematically computated average weight is out of tolerance on the minus side or out of tolerance on the positive side or within tolerance for the target weight. If it exceeds the tolerance an overweight display 315 is activated. If it is under the tolerance an underweight display 317 is activated. And if it is within the established target weigth a correct display 319 is activated. Once this determination is made, the initial momentary package weight monitoring function 303 is reset for the next package 101 which may run through the machine.

Figure 4:
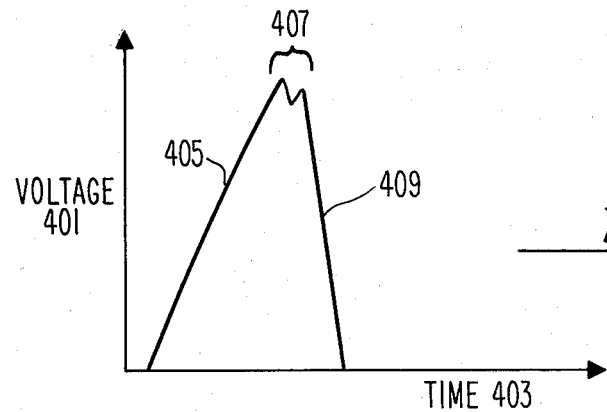
FIG. 4 shows a typical load cell signal processed by the circuitry of FIG. 2.

FIG. 4 shows a typical load cell 103 signal processed by the circuitry of FIG. 2. This signal is a plot of voltage 401 against time 403, the time 403 being plotted on the axis of abscissa.

As a package 100 begins to enter upon the weighing platter 101 the voltage typically output by the load cell 103 rises drastically 405. Once the package 100 is completely on the weighing platter 101, the drastic increase stops and the signal oscillates 407 with this oscillation beginning to dampen out. As the package 100 exits off the weighing platter 101 the voltage drastically decreases, operation 409.

Figure 5:
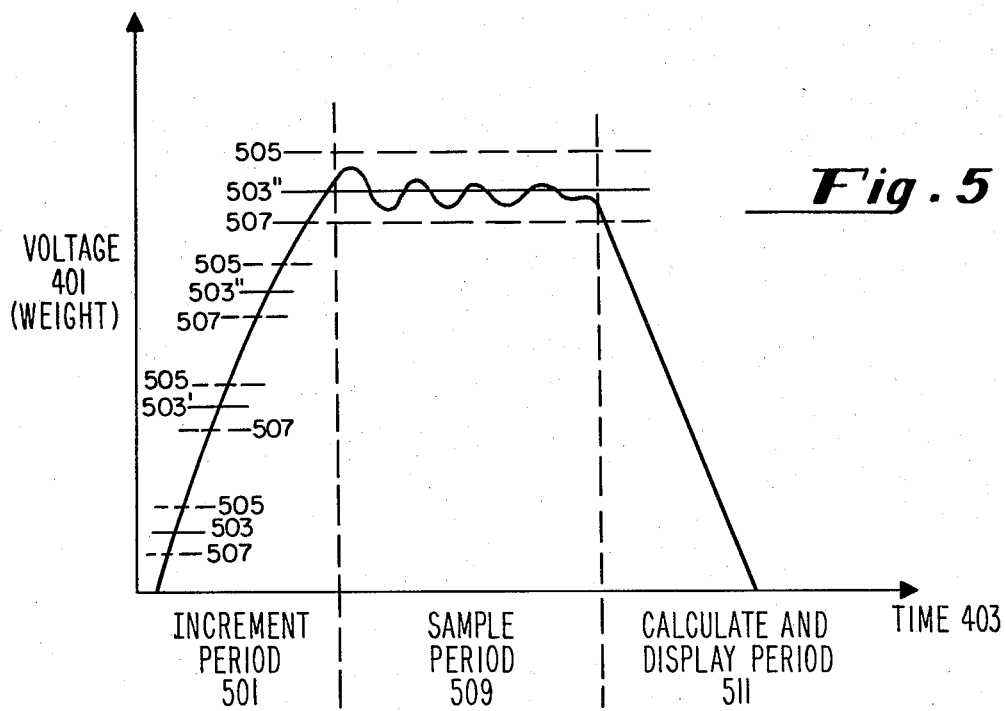
FIG. 5 shows the typical signal shown in FIG. 4 but in expanded format for illustrations, including pictorial illustration of operations performed on the signal by the circuitry of FIG. 2.

The typical output signal shown in FIG. 4 is shown in FIG. 5 in expanded format. Here, voltage 401 can be equated to weight measured. The circuitry 111 establishes a increment period 501 during which the weight analysis step 303 and increment step 305 of FIG. 3 are implemented. Here, a target weight 503 is initially set and incremented into target weights 503' and 503'' as it is determined that the sampled momentary package weight is increasing. These target weights of course are offset by a plus and minus tolerances, 505 and 507, respectively. An ultimate steady state target weight level is eventually established 503''' wherein operational step 307 takes over to establish a sample period 509. During this sample period the sampled weights oscillate about the target weight value 503''' with the ultimate signal tending to dampen out to a steady state. These oscillations are caused by the initial loading of the package 101 onto the weighing platter 103 and the initial shock impulse subjected to the mechanical structure which vibrates for a short period of time. The weight of the package 101 is sampled and stored during the sample period 509 at a rate of one value every five milliseconds. When operational step 307 determines that the weight has begun to decrease drastically, i.e., indicating that the package 100 is exiting the weighing platter 101, a calculate and display period 511, commonly called a classification, is established. During this period the samples stored during the sample period 509 are recovered and averaged via the operation 311 and it is determined if the average weight is out of tolerance or within tolerance as per the operations 313, 315, 317 and 319. At the end of this operation the circuitry is reset to process the next package.

Programmable microprocessor 205 contains process instructions in the form of electrical signals stored attendant thereto. FIG. 6 shows an operational flow diagram for a specific operational implementation. This implementation, FIG. 6, includes a power on step 601 which leads to an initialized system and check display and keyboard entry operation 603. Following this operation the keyboard is interrogated for the presence of information 605. If no information is present, the system is returned to the initial initialization step 603. If keyboard information is available, this information is stored and displayed 607. In addition, this information is interrogated to determine if it is target weight tolerance information 609.

If the keyboard information concerns target weight tolerance 609 this target weight tolerance is stored in a tolerance register 611. Following the storing of this tolerance information 611 load cell data is input 613.

If the keyboard information does not concern a target weight tolerance 609, the keyboard is interrogated to determine if the information concerns a calibration 615. If this information concerns a calibration, the calibration is entered and the processor is set to the calibration mode 617. In the calibration mode a display of the number of calibration runs is performed 619. When the number of calibration runs is completed 619 the microprocessor is returned to input load cell data 613.

If the keyboard information does not concern calibration 615, the keyboard is interrogated as to whether this information is a special function 621. If it does not concern special function, the microprocessor operation is returned to input load cell data 613. However, if the keyboard information concerns a special function this special function is processed 623 to input and output the special function 625.

Once load cell data is input into the machine 613 this information is analyzed to determine whether the package weight sensed is increasing 616. If this weight is increasing, the increase is analyzed to determine if it exceeds the tolerance band set 618. If it exceeds the tolerance band 618, the weight band is incremented or increased (moved) 620 and an average weight register is cleared 622.

Following the clearing of the average weight register 622, the keyboard input switches are read 624 and it is determined if any keyboard information is present 626. If no keyboard information is present control of the processor is returned to input load cell data 613. However, if there is keyboard information determined 626, control of the processor is returned to interrogate the keyboard information, operation 609.

If the weight is not increasing 616, the successive samples are interrogated to determine if the weight is decreasing 627. If this weight is not decreasing 627, the weight values stored are added and averaged into a weight register 629.

However, if the weight is decreasing 627, this decrease is then analyzed to determine if the decrease is larger than the tolerance band setting 631. If the decrease is less than the band setting 631, the load cell data is added to the weight register and averaged into the average weight value, operation 629. However, if it is determined that the decrease is larger than the tolerance band setting 631, the control circuitry is then interrogated to determine if the system is in the calibrate mode at input from the keyboard, operation 633. If it is determined that the system is in the calibrate mode 633, the calibration information is entered, 635. This information includes the number of calibration runs to be conducted. Each time a calibration run is conducted, the calibration run number is decreased by one, 637. If the calibration run register is not zero, control is returned, operation 639, to read keyboard switches, operation 624. However, once the calibrate run register reaches zero, the calibrate mode and calibrate average weight register are cleared, operation 641.

However, in operation 633, if the system is not in the calibrate mode, the control of the processor is directed to read the display switch 643 and then to determine if the switch is in an actual weight mode 645. If it is not in this mode, the processor is directed to classify the package and display a weight error, operation 647 and then to return the microprocessor to clear the average weight register, operation 622. However, if the switch is in actual weight mode, the processor is directed to classify the package and display the package weight, operation 649, before returning the microprocessor to clear the average weight register, operation 622.

A time to auto-zero operation 651 is investigated following each adding and averaging weight operation 629. If the time clock of the operation 651 determines that the circuit should not be zero, control of the microprocessor is returned to the read keyboard switch operation 624. However, if the time clock determines that it is time to zero the circuitry, the average weight is loaded into the auto-zero register, operation 653 and then the microprocessor is returned to read keyboard switches, operation 624.

Figure 7:
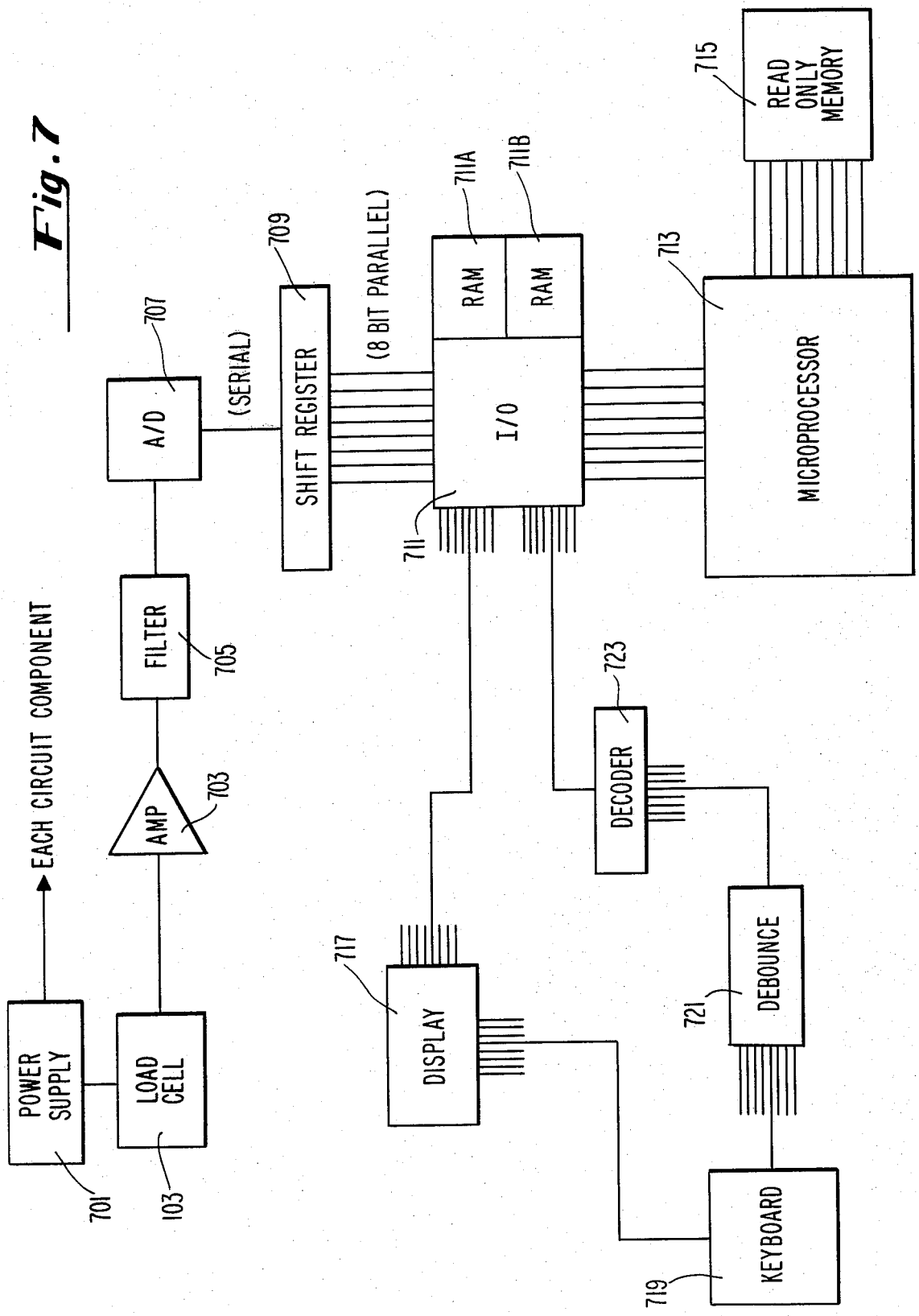
FIG. 7 shows a more detailed circuit diagram of the circuitry of FIG. 2 for implementing the operations of FIG. 6.

FIG. 7 shows a more detailed circuit diagram of the circuitry of FIG. 2 for implementing the operations of FIG. 6. Here a separate power supply 701 supplies power to the load cell 103 and the rest of the circuitry. This load cell 103 is a strain gauge transducer of the type produced and sold by Transducer, Inc., Model 562. This load cell transducer 103 is physically connected to the support for the weighing platter 101 and the transfer belt 105.

The output of the transducer is fed to an operational amplifier 703 of the type manufactured by Precision Monolithic, Inc., Model OP-07EJ. The output of the amplifier 703 is fed to a lowpass active filter 705.

A Micronetwork, Inc., Model ADC80, analog-to-digital (A/D) converter 707 is connected to the output of the filter 705. A serial-to-parallel shift register 709 is connected to the output of the analog-to-digital (A/D) converter 709. It will be readily understood that the circuitry described hereinabove with respect to FIG. 7, processes signal information in a serial manner. However, the circuitry described hereinbelow with respect to FIG. 7, processes circuit information in a parallel manner.

As input-output chip 711 is connected to the output of the shift register 709. This input-output chip 711 is a Rockwell Model 6532. The Rockwell 6532 chip 711 contains two random access memories, 711a and 711b, respectively. Each random access memory (RAM) 711a, 711b is 128 by 8, i.e., containing 128 storage locations for 8 bit words.

A Rockwell 6505 microprocessor 713 is connected to the input-output circuit 711.

An Intel 2716 read only memory (ROM) 715 is connected to microprocessor 713. This memory 715 is 2048 by 8, i.e., containing 2048 locations for 8 bit word. This read only memory 715 holds the control program instructions for controlling the operation of the microprocessor 713.

A 4-digit digital display 717 is driven by the output side of the input-output circuit 711. This display 717 includes 7 element light emitting diode (LED) displays, Hewlett Packard Model 5082-7653. Each LED display is driven by an RCA Model CD4511 driver. The display 717 contains 4 Hewlett Packard LED display elements.

A Grayhill 16 key keyboard 719 is used. This Grayhill keyboard is typical of many available in the marketplace for entering numeric information for momentary contact switches. The keyboard 719 drives a debounce circuit 721 which is typical in the industry and which contains an RCA 8-input NAND gate chip, Model CD4068.

A decoder 723 is connected to the output of the debounce circuit 721. The decoder 723 is of a typical design and includes an RCA 8-input NOR chip, Model CD4078 and an RCA 2-input Schmidt trigger NAND gate, Model TD4093. The output of the decoder 723 is connected to the input side of the input-output circuit 711.

A control program as specified by the flow diagram of FIG. 6 is entered into the read only memory 715. Under The direction of this program, the check weigher machine of this apparatus operates as follows.

The machine may be calibrated by entering the calibration mode on the keyboard 719. A calibration weight, this weight being equal to the weight of a "standard" calibration package, is entered into the machine via the keyboard 719. A "standard" package of predetermined and known weight is then run through the machine to calibrate the circuitry. When the package is run through the machine, the average weight value calculated is calibrated so that the output measured weight is equal to that value entered on the keyboard.

During the normal check weight operation, the output of the load cell 103 is amplified to the A/D converter 707 constantly sampled at a five millisecond rate. An initial target weight value is established with a variance range on either side. When successive load cell 103 voltage readings increase rapidly indicating the increment period 501, the target level is successively increased to follow the load cell 103 output increase. This increase is indicative of a package 100 entering upon the weighing platter 101.

Eventually, a steady state is established whereby the package 100 is solely bearing upon the weighing platter 101. During this period, load cell 103 output values are sampled, averaged and stored.

As the package 100 exits out of the weighing platter 101, the load cell 103 output drastically decreases and the circuitry stops the storing of load cell average output. During the calculate and display period of 511, the averaged load cell sample values are presented to represent the measured package weight. This measured package weight is then compared against the target weight with its variance range values which have been previously entered through the keyboard 719. The measured and calculated weight of the package 100 is then displayed as being over, under or within the target weight range.

While the automatic check weigher machine described herein is directed to the preferred embodiment of the invention, changes can be made in this embodiment without departing from the spirit and scope thereof. This disclosure, therefore, should be considered in its intent, as illustrative, and should not be read in the limiting sense.

What is claimed is:

1. An automatic weighing machine capable of weighing an object as it passes through said machine, "on-the-fly," and checking that weight against a predetermined weight value entered thereon, comprises:
    a transducing means for providing an electric circuit characteristic as a function of bearing weight;
    means associated with said transducing means for feeding said object onto said transducing means;
    discharge means associated with said transducing means for carrying said object away from said transducing means;
    means connected with said transducing means for transferring said object across said transducing means; and
    electric circuit means connected to said transducing means for providing electric power thereto, for continuously monitoring said transducing means electrical circuit characteristic whereby from said monitored characteristic said electric circuit means determines when said object is fully bearing on said transducing means, while being transferred across thereof, and determines the average weight of said object as a function of said continuous monitored characteristic.

2. The machine of claim 1, wherein said electric circuit monitoring means includes:
    means for obtaining multiple samples of said transducing electric circuit characteristic, said sampling means being connected to said transducing means;
    means for determining when the difference between a successive sampled characteristic value and the immediately preceeding sampled characteristic value has increased beyond a predetermined range, said increasing sampled value determining means being connected to said sampling means;
    means for storing a plurality of sampled characteristic values;
    means for determining when a successive sampled characteristic value has decreased beyond a predetermined range from the immediately preceeding sampled value, said decreasing sample value determining means being connected to said sampling means;
    means for mathematically calculating the average of plural sample values in said storing means, said calculating means being connected thereto;
    means for displaying weight; and
    control means connected to said increasing sampled value determining means, to said decreasing sampled value determining means, to said storing means, to said display means, and to said calculating means for causing successive plural sampled values to be stored once said successive sampled values cease increasing beyond said predetermined range, for stopping said storing once said successive sampled values begin decreasing beyond said predetermined range, for causing the average of said stored sampled values to be calculated and for causing said average value to be displayed as weight.

3. The machine of claim 2, wherein said transducing means includes a weighing platter and load cell structure.

4. The machine of claim 3, wherein said means for obtaining multiple samples includes a signal conditioning and analogue to digital converter circuit.

5. The machine of claim 4, wherein said means for storing a plurality of sampled characteristic values includes a microprocessor input-output circuit containing a plurality of random access memories, said input-output circuit being connected to said analogue to digital converter circuit.

6. The machine of claim 5, wherein said increasing sampled value determining means includes a microprocessor connected to said input-output circuit and accessing a first one of said random access memories; and a read only memory connected to said microprocessor, said read only memory containing a program of control words output therefore as electric signals for sequentially directing the activity of said microprocessor.

7. The machine of claim 6, wherein said decreasing sampled value means includes an interconnection for operation of said microprocessor to said input-output circuit and a second one of said random access memories; and a dedication of portions of said microprocessor under the operation of said read only memory control word electric signals.

8. The machine of claim 7, wherein said mathematical calculating means includes an arithmetic portion of said microprocessor.

9. The machine of claim 8, wherein said display means includes a digital display connected to said input-output circuit.

10. The machine of claim 9, wherein said control means includes a control gate portion of said microprocessor, said portion being connected to receive said read only memory control work electric signals and containing a 200 Hz clock.

11. The machine of claim 10, also including a keyboard input means connected to said input-output circuit for entering data.

12. The machine of claim 11, also including means for electrically sensing the operation of said transferring means, being connected to said input-output circuit.

13. A process for automatically checking the weight of a package against a predetermined desired weight including the steps of:
    loading said package onto a weight detecting transducing medium;
    transferring said package across said weight detecting transducing medium;
    continuously electrically powering said weight detecting transducing medium;

successively sampling said electrical output from said weight detecting trandsducing medium;

establishing a predetermined threshold range;

determining when said successive output samples are increasing in increments greater than said predetermined range and when they are decreasing in increments greater than said predetermined range;

determining a storage sampling period when said successive output samples are within said predetermined range and not within a quiescent state range and said transferring step is in progress;

storing successive output samples obtained during said storage sampling period;

calculating the average of said stored samples at the end of said sampling period which calculating is initiated upon the determination of said successive samples decreasing in increments greater than said predetermined values; and transferring any said calculated average into a display of weight.

14. The process of claim 13, also including steps of:

entering a target weight and an acceptable plus and minus variance therefrom prior to loading said package;

checking said displayed weight against an entered target weight; and displaying whether said checked weight is within said entered target variance, or below or above thereof.

15. The process of claim 14, wherein said package load is of a predetermined calibration weight, wherein said target weight entered is the weight of said calibration package, and wherein calculating step includes calibrating said calculated average to transform said displayed weight into said entered calibration weight value.

* * * * *